3,300,526
PREPARATION OF NITRILES

Kurt Kirsch, Dossenheim, Germany, assignor to Lonza Ltd., Gampel, Switzerland
No Drawing. Filed June 5, 1964, Ser. No. 373,066
Claims priority, application Germany, June 7, 1963, T 24,114
1 Claim. (Cl. 260—465.2)

This invention relates to the preparation of nitriles of carboxylic acids from the respective amides.

Carboxylic acid nitriles are valuable starting compounds for chemical reactions. They are prepared from amides by splitting off water. Several such methods for the dehydration of acyl amides are known. It is also known to convert cyanacetamide in a suitable reaction medium such as benzene, dichloroethane, or organic nitrogen bases, e.g., pyridine, to malonic acid dinitrile by means of dehydrating phosphorus compounds. All such methods have been unsatisfactory with respect to yield and selectivity.

It is a principal object of this invention to provide a simple method to dehydrate the amides of mono or dicarboxylic acids or of cyano-carboxylic acids in excellent yields and good selectivity to the respective nitriles or dinitriles.

Other objects and advantages will be apparent from a consideration of the specification and claims.

The invention consists in dehydrating the respective amide, in the presence of a suitable phosphorus compound as dehydrating agent, in a reaction medium comprising an acyl nitrile, which is liquid under the conditions of the reaction.

In this way, it is easy to prepare, for instance, acetonitrile from acetamide, benzonitrile from benzamide, adipic acid dinitrile from adipic acid diamide, phthalonitrile from phthaldiamide, and others. My novel method is particularly suitable for the preparation of malononitrile from cyanoacetamide.

As suitable reaction medium, I may use aliphatic, cycloalphatic or aromatic nitriles, such as acetonitrile, isobutyronitrile, adiponitrile, benzonitrile, and others. In selecting the reaction medium, the boiling point differential between the same and the end product should be such as to provide for a ready separation. In some cases it may be, however, of advantage to use the reaction product itself as reaction medium.

A particular advantage of using nitriles as reaction medium resides in the shortened reaction time; this is important for increasing the yield and improving the purity of the end product. For instance, the dehydration of cyanoacetamide to malononitrile is terminated within 1½ to 2½ hours.

Generally, the carboxylic acid amide to be dehydrated, heated at reaction temperature, will be introduced into the reaction medium containing the dehydrating agent.

In another embodiment of the invention, reaction medium, dehydrating agent, and carboxylic acid amide are mixed and then heated to reaction temperature.

Preferably, the weight ratio of reaction medium to carboxylic acid amide at the beginning of the reaction is adjusted within the range of 5:1 to 2:1, and the reaction is carried out within the temperature range of 60 to 100° C.

Suitable dehydrating agents of the phosphorus group are, e.g., $POCl_3$, $PCl_5$, $P_2O_5$, and mixtures thereof. During the dehydrating reaction, metaphosphoric acid is formed and collects as slurry in the reaction medium; if chlorine containing phosphorus compounds are employed, hydrogen chloride is formed, which escapes continuously during the reaction.

In order to obtain the metaphosphoric acid in a readily removable state, it is of advantage to carry out the reaction in the presence of a metal halide of the group of Lewis acids. Examples of such metal halides are $AlCl_3$ and $ZnCl_2$. An excessive amount of such metal halide affects the yield, while an inadequate amount produces metaphosphoric acid which does not filter satisfactorily. I have found that it is of advantage to use more than 0.036, preferably, 0.054 to 0.072 mole of Lewis acid per mole of formed metaphosphoric acid.

Because of the ready availability of cyanacetamide and the high rate of reaction and yield, the preparation of malononitrile from cyanoacetamide in the presence of acetonitrile is of particular interest.

The following examples are given to illustrate the invention. All the examples were carried out in a three-neck flask equipped with thermometer, reflux cooler and stirrer.

Example 1

A mixture of 800 cc. of acetonitrile, 13.3 g. of aluminium chloride, 256 g. of phosphorus oxychloride, and 280 g. of cyanoacetamide is heated to reflux temperature (80° C.) and strongly boiled with vigorous stirring. The formed HCl is drawn off from the cooler. After 2 hours, the HCl development ceases, indicating the termination of the reaction. The mixture is cooled, the formed metaphosphoric acid filtered off, and the residue is washed with acetonitrile. The combined filtrates are distilled in vacuo. There are obtained 209 g. of malononitrile in a yield of 95% of theory. The melting point of the product is 31–32° C.

Example 2

Example 1 is repeated whereby isobutyronitrile is used instead of acetonitrile. The mixture is maintained for 5 hours at 80–85° C. After cooling and filtering of the solid metaphosphoric acid, malononitrile is obtained by fractionated distillation in a yield of 88%.

Example 3

Example 1 is repeated but instead of acetonitrile, adiponitrile is used as solvent, and the mixture is kept for 5 hours at a temperature of 85° C. Malonic acid dinitrile is obtained in a yield of 83%.

Example 4

51 g. of malonic acid diamide are refluxed for 5 hours in 400 cc. of acetonitrile containing 3 g. of aluminium chloride and 80 g. of phosphorus oxychloride. After filtration of the metaphosphoric acid, malononitrile was separated from the solvent by distillation.

Example 5

72 g. of adipamide are refluxed for 5 hours in 400 cc. of acetonitrile containing 3 g. of aluminium chloride and 85 g. of phosphorus oxychloride. After filtering the formed metaphosphoric acid, the adipic acid dinitrile is recovered by distillation.

Example 6

60.5 g. of benzamide in 300 cc. acetonitrile, in mixture with 1.5 g. of aluminium chloride and 40 g. of phosphorus oxychloride, and refluxed for a period of 5 hours. The formed metaphosphoric acid is filtered off and the benzonitrile is separated from the solvent by distillation.

Example 7

118 g. of acetamide in 500 cc. of adiponitrile containing 6 g. of aluminium chloride and 165 g. of phosphorus oxychloride are maintained for 3.5 hours at a temperature of 95° C. After that time, the reaction is terminated. After filtration of the metaphosphoric acid, acetonitrile is recovered from the solvent by distillation.

I claim:

A process for the preparation of malononitrile comprising heating cyanoacetamide in the presence of a dehydrating agent selected from the group consisting of phosphorus oxychloride, phosphorus pentoxide, phosphorus pentachloride, and mixtures thereof, and in the presence of a metal halide selected from the group consisting of aluminium chloride and zinc chloride, at a temperature in the range of 60 to 100° C. in acetonitrile as reaction medium, the weight ratio of acetonitrile to cyanoacetamide being in the range of 5:1 to 2:1.

References Cited by the Examiner

UNITED STATES PATENTS

| | | | |
|---|---|---|---|
| 2,273,633 | 2/1942 | Fluchaire et al. | 260—465.2 |
| 2,358,191 | 9/1944 | Tishler et al. | 260—465.2 X |
| 2,389,217 | 11/1945 | Surrey | 260—465.2 |
| 2,802,857 | 8/1957 | Kesslin et al. | 260—465.2 |
| 3,131,209 | 4/1964 | King | 260—465 |
| 3,133,953 | 5/1964 | Miwa et al. | 260—465.2 |

CHARLES B. PARKER, *Primary Examiner.*

JOSEPH P. BRUST, *Examiner.*